(12) United States Patent
Chabrol

(10) Patent No.: US 7,123,799 B2
(45) Date of Patent: Oct. 17, 2006

(54) DEVICE FOR TRANSMITTING OPTICAL WAVES WITH INCLINED COUPLING SURFACES

(75) Inventor: Claude Chabrol, Froges (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/474,531

(22) PCT Filed: Apr. 5, 2002

(86) PCT No.: PCT/FR02/01199

§ 371 (c)(1),
(2), (4) Date: Aug. 19, 2004

(87) PCT Pub. No.: WO02/084355

PCT Pub. Date: Oct. 24, 2002

(65) Prior Publication Data

US 2005/0002612 A1    Jan. 6, 2005

(30) Foreign Application Priority Data

Apr. 10, 2001  (FR) .................................. 01 04887

(51) Int. Cl.
G02B 6/30 (2006.01)
G02B 6/26 (2006.01)
G02B 6/36 (2006.01)
G02B 6/42 (2006.01)

(52) U.S. Cl. ............................ 385/49; 385/39; 385/63; 385/83

(58) Field of Classification Search .................. 385/49, 385/65
See application file for complete search history.

(56) References Cited

U.S. PATENT DOCUMENTS

| | | | | |
|---|---|---|---|---|
| 3,864,016 A | * | 2/1975 | Dakss et al. | 385/49 |
| 3,864,019 A | * | 2/1975 | Smolinsky et al. | 385/49 |
| 3,912,363 A | * | 10/1975 | Hammer | 385/49 |
| 4,210,923 A | * | 7/1980 | North et al. | 257/432 |
| 5,046,808 A | * | 9/1991 | Chang | 385/13 |
| 5,371,820 A | * | 12/1994 | Welbourn et al. | 385/76 |
| 5,671,316 A | * | 9/1997 | Yuhara et al. | 385/137 |
| 6,212,320 B1 | * | 4/2001 | Rickman et al. | 385/49 |
| 6,334,014 B1 | * | 12/2001 | Nitta et al. | 385/39 |

(Continued)

FOREIGN PATENT DOCUMENTS

EP          0527604          2/1993

(Continued)

*Primary Examiner*—Brian Healy
*Assistant Examiner*—Charlie Peng
(74) *Attorney, Agent, or Firm*—Meyertons, Hood, Kivlin, Kowert & Goetzel, P.C.; Eric B. Meyertons

(57) ABSTRACT

The invention concerns an integrated-structure device for transmitting optical waves comprising a plurality of optical microguides (11), a plurality of notches (12) with coupling surfaces through which respectively emerge said optical microguides; optical fibers whereof the end parts are respectively arranged and fixed in said notches so as to optically couple the end surfaces of said optical fibers and said coupling surfaces of said optical microguides; said coupling surfaces (7) of said notches (4) extend perpendicular to said integrating planes and are slanting relative to the longitudinal direction of the end part (5) of the optical fiber (6) and/or of said optical micro-guide (3) and are aligned; said end surfaces (8) of said optical fibers (6) extend parallel to said coupling surfaces (7) of said notches (4) and are aligned.

1 Claim, 2 Drawing Sheets

U.S. PATENT DOCUMENTS

2002/0118917 A1* 8/2002 Kawai ..................... 385/31
2003/0091289 A1* 5/2003 Saito et al. ................ 385/49
2003/0235371 A1* 12/2003 Shimada et al. ........... 385/50

FOREIGN PATENT DOCUMENTS

WO   9607118   3/1996

* cited by examiner

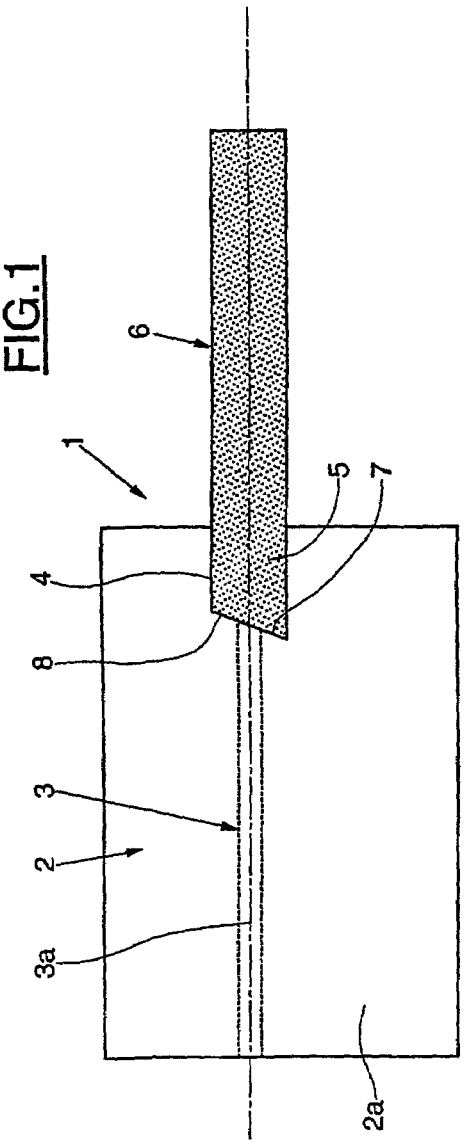
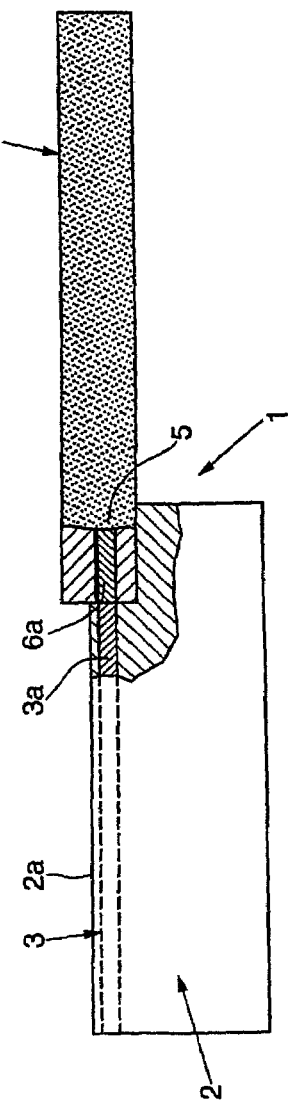

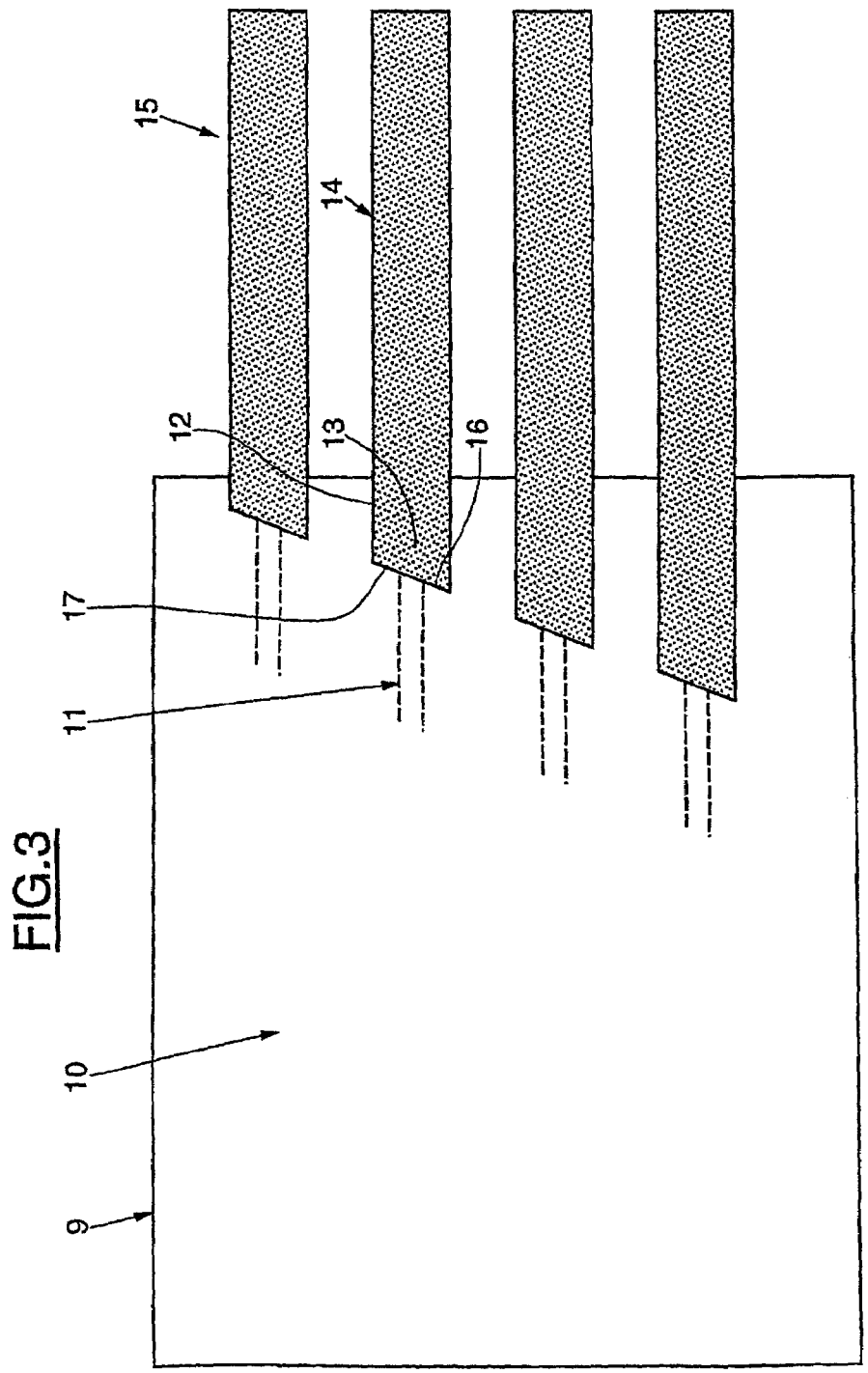

DEVICE FOR TRANSMITTING OPTICAL WAVES WITH INCLINED COUPLING SURFACES

The present invention relates to an optical wave transmission device that has an integrated structure to which at least one optical fiber is optically coupled.

It is known to cut the end of an optical fiber obliquely and to produce a bevel on one edge of an integrated structure into which an integrated optical microguide runs laterally, in such a way that the end of this integrated microguide is beveled, said bevel being in general polished flat.

Having placed the beveled end of the optical fiber on the bevel of the integrated structure, the optical interface between the optical fiber and the integrated optical microguide is therefore oblique.

Such an arrangement prevents or limits parasitic reflections liable to occur at the interfaces between the optical fibers and the integrated optical microguides. Documents EP-A-0 527 604 and WO-A-96/07118 describe such set-ups.

On applying the foregoing arrangement, it has already been proposed to cut and polish, at an oblique angle, the end of a sheet of parallel optical fibers grouped together in a flat plastic ribbon, the end plane being oblique or inclined to the plane of the ribbon, and to produce a polished bevel on one edge of an integrated structure into which integrated optical microguides run laterally, in such a way that the ends of these integrated microguides are beveled. The beveled end of the sheet of optical fibers is then laid flat against the polished bevel of the integrated structure so as to optically couple the optical microguides to the optical fibers.

In the above arrangements, it is difficult to position the optical fibers with respect to the integrated optical microguides because the oblique ends of the optical fibers may slip along the surfaces of the bevels of the integrated structures.

Furthermore, such arrangements cannot be applied when it is desired for the interfaces between the optical fibers and the optical microguides to be far from the edges of the integrated structures.

The aim of the present invention is in particular to remedy this drawback and the subject of the invention is an optical wave transmission device of integrated structure that may include the following provisions.

The structure according to the invention includes a multiplicity of optical microguides that lie in an integration plane, are located beside one another and are of parallel directions, and a multiplicity of notches that have coupling faces through which the respective said optical microguides emerge and that lie perpendicular to said integration planes.

The device according to the invention includes optical fibers, the end parts of which are respectively placed and fixed in said notches and lie parallel to the integration planes of said structure so as to optically couple the end faces of these optical fibers to the aforementioned coupling faces of said optical microguides.

According to the invention, said coupling faces of said notches lie perpendicular to said integration planes and are oblique to the longitudinal direction of the end part of the optical fiber and/or of said optical microguide and are aligned.

According to the invention, said end faces of said optical fibers lie parallel to said coupling faces of said notches and are aligned.

According to the invention, the longitudinal directions of the end parts of the optical fibers preferably coincide with the longitudinal directions of said optical microguides.

According to the invention, said optical fibers are preferably assembled to grouped together in the form of a sheet.

The present invention will be more clearly understood on studying the optical wave transmission devices described by way of non-limiting examples and illustrated by the drawing in which:

FIG. 1 shows a top view of a first optical wave transmission device according to the present invention;

FIG. 2 shows a longitudinal section on II-II of the device in FIG. 1; and

FIG. 3 shows a top view of a second optical wave transmission device according to the present invention.

Referring to FIGS. 1 and 2, these show an optical wave transmission device 1 that includes an integrated optical structure 2 having, in an integration plane lying parallel to its surface 2a, a longitudinal microguide 3 and a longitudinal recessed part or notch 4 into which the optical microguide 3 runs.

The end part 5 of an optical fiber 6 is placed longitudinally in the notch 4 and fixed therein, for example by adhesive bonding, in such a way that the transverse end face 7 of the notch 4 and the end face 8 of the optical fiber 6 are close to each other or in contact, and in such a way that the transmission core 3a of the optical microguide 3 is optically coupled to the transmission core 6a of the optical fiber 6, the longitudinal direction of the end part 5 of the optical fiber 6 coinciding with the longitudinal direction of the optical microguide 3.

The transverse end face 7 of the notch 4, which constitutes a coupling face for the microguide 3, lies approximately perpendicular to the integration plane of the integrated structure 2. In addition, this coupling face 7 is oblique to the longitudinal direction of the optical microguide 3 in such a way that the lines of intersection between, on the one hand, the integration plane of the integrated structure 2 and on the other hand, the coupling face 7 of the notch 4 and a plane perpendicular to the longitudinal direction of the optical microguide 3 are inclined and make an angle of, for example, about eight degrees.

Correspondingly, the end face 8 of the optical fiber 6 is oblique to the longitudinal direction of the end part 5 of the optical fiber 6, in such a way that the lines of intersection between, on the one hand, the integration plane of the integrated structure 2, and on the other hand, the end face 8 of the optical fiber 6 and a plane perpendicular to the longitudinal direction of the end part 5 of the optical fiber 6 are inclined and make an angle of, for example, about eight degrees.

The notch 4 is advantageously produced by photolithography and etching, in such a way that it can be provided at any point on the surface of the integrated structure 2.

Referring to FIG. 3, this shows an optical wave transmission device 9 that comprises an integrated optical structure 10 having a multiplicity of integrated optical microguides 11 formed in an integration plane, and a multiplicity of longitudinal notches 12 in which are installed and fixed the longitudinal end parts 13 of optical fibers 14 held together so as to constitute a flat sheet 15, the optical fibers 14 being, for example, linked together by a plastic (not shown).

The transverse end faces 16 of the notches 12, which constitute coupling faces of the optical microguides 11, and the end faces 17 of the optical fibers 14 are placed, with respect to the optical microguides 11 and to the optical fibers 14 respectively, as in the example described with reference to FIGS. 1 and 2.

Furthermore, in this example, the coupling faces 16 are aligned in such a way that they lie within the same plane perpendicular to the integration plane of the integrated optical structure 10 and oblique or inclined to a plane perpendicular to the direction of the optical microguides 11.

Correspondingly, the end faces 17 of the optical fibers 14 of the sheet 15 lie in the same plane, oblique or inclined to the plane of this sheet.

Thus, the optical fibers 14 of the sheet 15 may be sectioned at the same time and may be polished collectively so as to form their oblique end faces 17.

The present invention is not limited to the examples described above. Many alternative embodiments are possible without departing from the scope defined in the appended claims.

The invention claimed is:

1. An optical wave transmission device of integrated structure, comprising:
    three or more optical microguides that lie in an integration plane, the end parts of which are located beside one another and are of approximately parallel directions;
    three or more notches that have coupling faces through which the respective said end parts of said optical microguides emerge and that lie perpendicular to said integration plane; and
    optical fibers assembled or grouped together in the form of a sheet, the end parts of which are respectively placed and fixed in said notches and lie parallel to the integration plane of said structure so as to optically couple the end faces of these optical fibers to the aforementioned coupling faces of said optical microguides;
    wherein said coupling faces of said notches lie perpendicular to said integration plane and are oblique to the longitudinal direction of the end part of the optical fiber and of said optical microguide and are aligned, and wherein the longitudinal directions of the end parts of the optical fibers coincide approximately with the longitudinal directions of said end parts of said optical microguides; and wherein said end faces of said optical fibers lie parallel to said coupling faces of said notches and are aligned;
    wherein a length of at least three of the notches, in order from an end of the integrated structure toward an opposite end, is progressively longer than the previous notches; and wherein the length of at least thereof the optical fibers, in order, is longer than the previous optical fibers.

* * * * *